United States Patent
Park et al.

[11] Patent Number: 5,881,044
[45] Date of Patent: Mar. 9, 1999

[54] OPTICAL DISK WRITE/READ APPARATUS AND OPTICAL DISK WRITE METHOD

[75] Inventors: Sang-On Park, Seoul; Jong-In Shin, Kyungki-do, both of Rep. of Korea

[73] Assignee: LG Electronics Inc., Seoul, Rep. of Korea

[21] Appl. No.: 1,012

[22] Filed: Dec. 30, 1997

[30] Foreign Application Priority Data

Dec. 31, 1996 [KR] Rep. of Korea .................. 1996-79272

[51] Int. Cl.[6] ...................................................... G11B 7/00
[52] U.S. Cl. ............................................. 369/116; 369/54
[58] Field of Search ................................. 369/44.32, 54, 369/116

[56] References Cited

U.S. PATENT DOCUMENTS 5,216,660   6/1993   Iimura ...................................... 369/116

*Primary Examiner*—Eddie P. Chan
*Assistant Examiner*—Kim-Kwok Chu

[57] ABSTRACT

Optical disk write/read apparatus and optical disk write method of the present invention is to generate a RF signal from a strong reflection light of the early stage reflected from the optical disk, to add a compensation signal according to the RF signal to the drive signal of the optical write laser diode, to control the write power of the laser diode, to quickly generate the pit, to make the pit edge sharp, to make it possible to write data on the optical disk by the low write power.

These objects are accomplished by generating the write control signal according to the write signal obtained from encoder and the write power reference which is necessary to generate the pit on the optical disk and is generated by a microcomputer, by generating the write power of the laser diode according to said control signal, by starting writing data on the disk by irradiating the write power on the optical disk and then generating a RF signal from the reflection light of the laser diode reflected from the optical disk, by generating a compensation control signal from said RF signal, and by adding the compensation control signal to said write control signal.

6 Claims, 4 Drawing Sheets

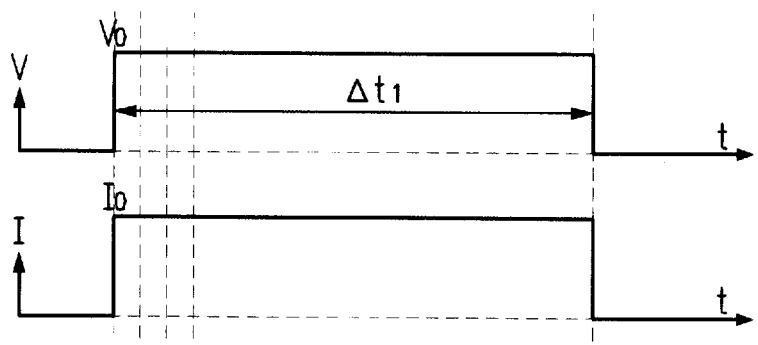
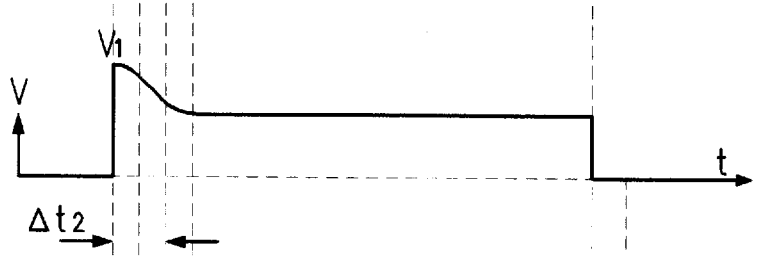
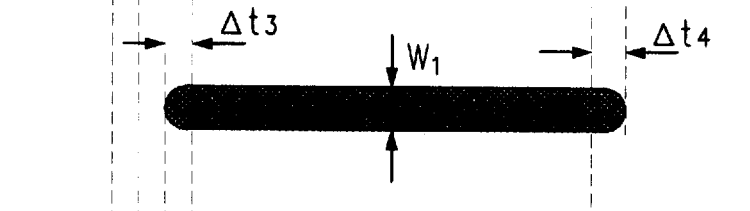
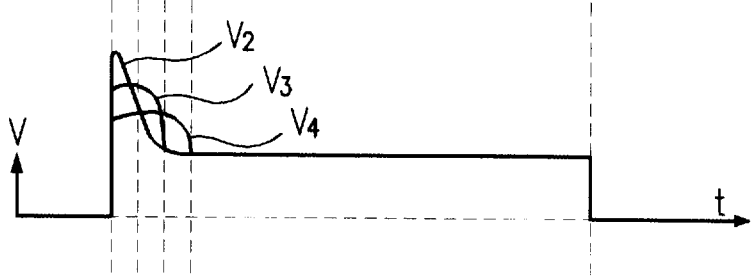
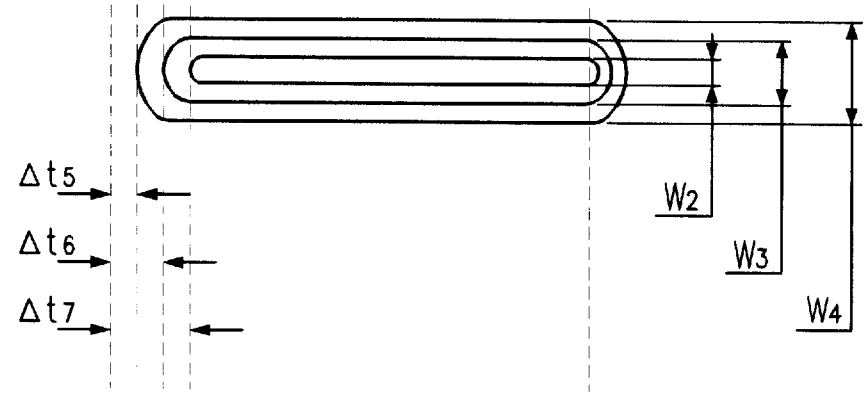
FIG.2A prior art
FIG.2B prior art
FIG.2C prior art
FIG.2D prior art
FIG.2E prior art
FIG.2F prior art

OPTICAL DISK WRITE/READ APPARATUS AND OPTICAL DISK WRITE METHOD

BACKGROUND OF THE INVENTION

1. Field of Invention

The present invention relates to an optical disk write/read apparatus for writing data on the optical disk and for reading data from the optical disk and the optical disk write method by using a modulation of light power in writing data on the optical disk, more particularly, to an optical disk write/read apparatus for writing data on the optical disk and for reading data from the optical disk and its write method by modulating the laser power which is irradiated to optical disk by feeding a RF signal which is transformed from the reflection light reflected from the optical disk, so as to improve the characteristic of the pit generation in writing mode, back to a controller.

2. Discussion of the Related Art

A conventional optical disk write apparatus, as shown in FIG. 1, consists of laser diode 1 which is to write data on an optical disk and to read data from the optical disk, microcomputer 7 which sets up, according to the user command, the write/read power reference necessary to generate a pit and controls a system, a read controller 3 which is responsive to the read power reference of said microcomputer 7 and to a read control signal from an external encoder 11 and controls the laser emission of a laser diode 1 and the operation timing through a voltage-current converter 5, a write controller 4 which is responsive to the write power reference signal of said microcomputer 7 and a write control signal from an external encoder 11 and controls the laser emission of a laser diode 1 and the operation timing through a voltage-current converter 5', a monitor diode 2 which detects, in order to keep the change of the laser power within a certain range during the write and read modes, a reflection light reflected from the optical disk according to the emitted light of the laser diode 1 and feeds the detected signal back to the read controller 3 or a write controller 4, a temperature compensation circuit 6 which compensates the change of the emitted light of the laser according to the temperature change and makes a laser emission of constant power, quad photodiodes 9 in which four photodiodes receive the reflection light reflected from the optical disk 8 and convert the four light into four RF signals, and a RF amplifier 10 which adds said four RF output signals from said quad photodiodes 9 and amplifies the added signal.

In the conventional optical disk write/read apparatus, as described above, if a user inputs a command for writing (or reading) to the apparatus, microcomputer 7 generates the write (or read) power reference necessary to generate a pit according to said command and, by switching the laser diode 1 according to the waveform obtained from said write (or read) power reference and said encoder 11, writes data onto (or reads data from) the optical disk 8. During writing (or reading), a monitor diode 2 detects the reflection light reflected from the optical disk 8 according to the laser power emitted from a laser diode 1 and the detected signal is applied to the write controller 4(or the read controller 3). When a change of the present laser power is detected, the write controller 4 (or the read controller 3) is modified in order to compensate the change. Therefore, it is possible to prevent the write power (or the read power) from going out of a certain range because of any internal or external disturbances. If the laser power is changed according to temperature change during writing (or reading), the change of the laser power is detected by a temperature compensation circuit 6 and a signal corresponding to the laser power change is sent to the write controller 4 (or the read controller 3). The write controller 4 (or the read controller 3) is based on the signal and controls the laser power of the laser diode 1 to be constant in the writing (or reading) mode.

And the conventional optical disk write operation is done as follows:

As shown in FIG. 2A, in order to write a pit of a specified length on the optical disk 8, a write signal (a write pulse) $V_0$ which turns on the laser diode 1 for the time $\Delta t_1$ corresponding to the generation of the pit length, is generated by encoder 11. The write pulse $V_0$ is applied to the write controller 4 under the control of a microcomputer 7 and then is transformed into a write current $I_0$ through a voltage-current converter 5, as shown in FIG. 2B. The write current $I_0$ is applied to the laser diode 1. When the write power of the laser is irradiated on the optical disk 8, the write power is reflected from the optical disk 8. The quad photodiodes 9 converts the reflection light reflected from the optical disk 8 into an RF signal $V_1$, as shown in FIG. 2C. The RF signal $V_1$ of the photodiodes 9 corresponding to the reflection light reflected from the optical disk 8 is a large signal in the early stage of the pit generation. After the pit is generated, the RF signal becomes a little smaller but it maintains a stable RF signal level. If the write material on the optical disk 8 is heated by the write power of the laser diode 1 and its temperature goes up to a threshold level, the phase change of the write material, for example, the change from a crystalline structure to an amorphous structure in a phase change material, occurs. As the result, a pit is generated. At this time, as shown in FIG. 2D, there are a time delay $\Delta t_2$ corresponding to the absorption of heat necessary for a pit to be generated and a time delay $\Delta t_3$ which is necessary for the width of the pit to be a stable value of $W_1$.

Therefore, even though the write power of laser diode 1 is applied on the optical disk 8, the pit is not immediately generated on the optical disk 8 and a time delay ($\Delta t_2 + \Delta t_3$) which is necessary for the temperature of the write layer on the optical disk 8 to go up to a threshold level and to be stable exists.

Moreover, even though the write power is removed, the pit generation does not completely stop. There is a time delay $\Delta t_4$ until the pit generation stops.

Because each optical disk, as shown in FIG. 2E, has the write layer or the reflection layer with a unique characteristic, even though a constant write power is applied to the optical disk 8, the RF signal levels according to the reflection light reflected from the optical disk 8 are $V_1$, $V_2$ and $V_3$, not equal values like these. Therefore, as shown in FIG. 2F, the write pit generations are delayed by $\Delta t_5$, $\Delta t_6$ and $\Delta t_7$, respectively, and each pit is different each other in its total length and the width of each pit is also different each other, for example $W_1$, $W_2$ and $W_3$ in FIG. 2F.

As explained above, because the conventional optical disk write/read apparatus or the conventional write method uses always a constant rectangular laser power at any time after the completion of the pit as well as at the beginning of the pit generation, the pit edge is formed by the small heat energy being transferred into the optical disk at the early stage. Therefore, the jitter characteristic is too bad and the time necessary for the pit to be generated is long. Furthermore, because of the difference of the reflection coefficients in the pit generation, there are some problems of which each optical disk has different pit length each other and the width of the pit becomes comparatively wide.

SUMMARY OF THE INVENTION

Accordingly, the present invention is directed to solve these problems of the conventional techniques and is to provide an optical disk write/read apparatus and a optical disk write method in which, at the early stage of the write mode, a RF signal is generated by using the reflection light reflected from the optical disk, a compensation signal according to the RF signal is added to the drive signal of optical write laser diode, the write power of the laser diode is therefrom controlled, and therefore the pit is quickly generated, the pit edge is sharp and it is possible for the write power to be low.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the optical write method according to the present invention includes a step of generating a write control signal according to the write/read signal generated from a encoder and the write power reference signal which is generated from a microcomputer and is necessary in a pit generation on the optical disk, a step of starting the write mode by generating the write power of the laser diode according to said control signal and by applying said write power to the optical disk, and a step of modulating the write power of said laser diode by adding said write control signal and a compensation signal which is generated from the RF signal obtained from the reflection light of said laser diode power.

The optical write/read apparatus of the present invention includes a write controller for generating a write control signal according to both a write signal obtained from encoder and a write power reference which is necessary for the pit generation, is generated in a microcomputer according to user command and is transmitted therefrom, a read controller for generating a read control signal according to both a read signal obtained from encoder and a read power reference which is necessary for the optical disk read operation, is generated in a microcomputer according to user command and is transmitted therefrom, a voltage-current converter for converting the output voltage of said write controller or said read controller into a specific level of current, a write power generator which is driven by each of said voltage-current converters and is to generate a write/read power to write data on the optical disk or to read data from the optical disk, a write power modulator for modulating the power of said write power generator by generating a RF signal by using the reflection light reflected from the optical disk according to the write power of said write power generator, by generating a compensation signal from said RF signal, and by feeding said compensation signal back to the write power generator.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIGS. 2(A)–2(F) are the signal waveform in a write mode of the conventional optical disk.

DETAILED DESCRIPTION OF THE PREFERRED EMBODIMENT

Reference will now be made in detail to the preferred embodiments of the present invention, examples of which are illustrated in the accompanying drawings.

Figure 1:
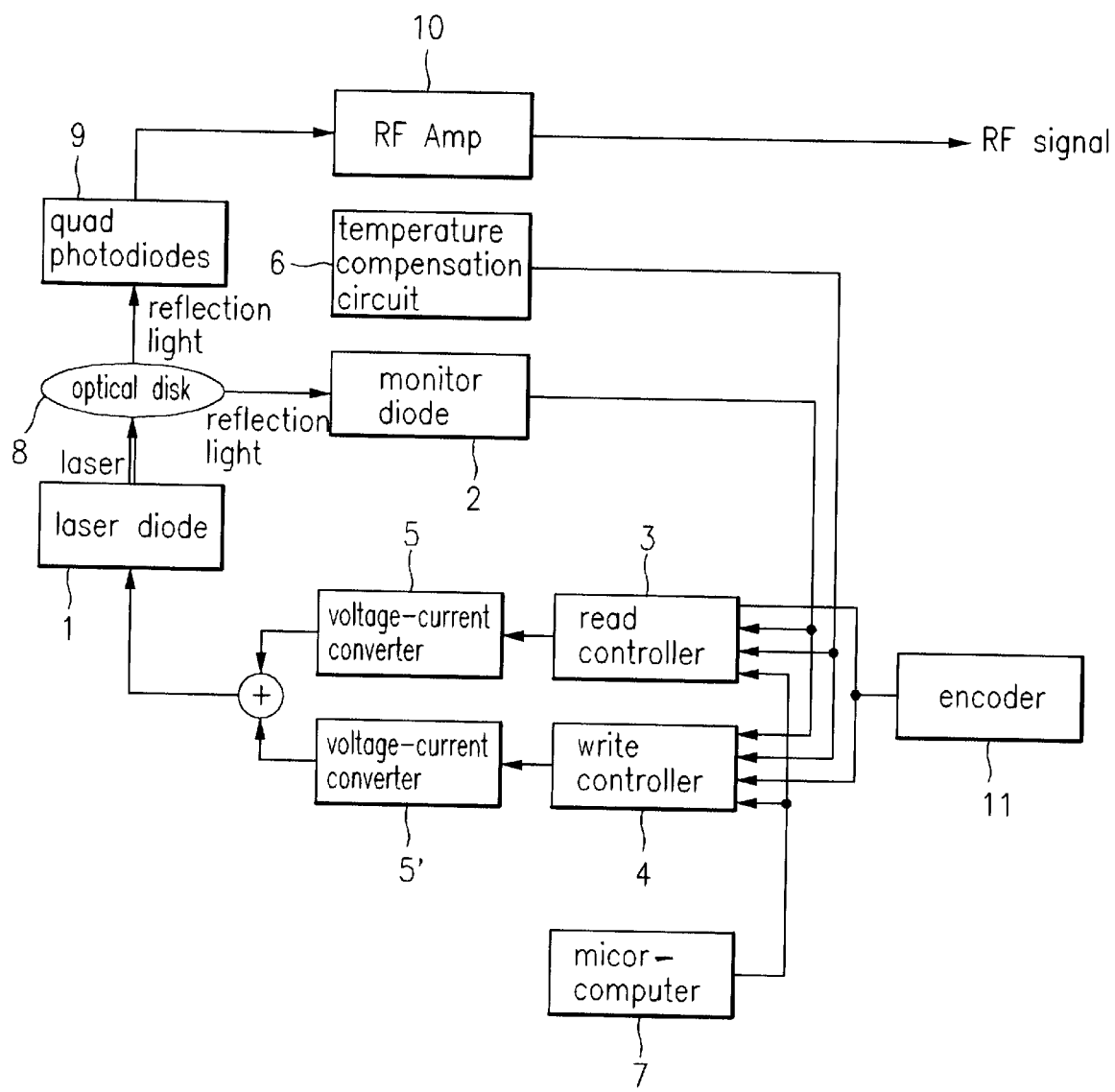
FIG. 1 is a block diagram showing the conventional write/read apparatus for an optical disk.
Figure 3:
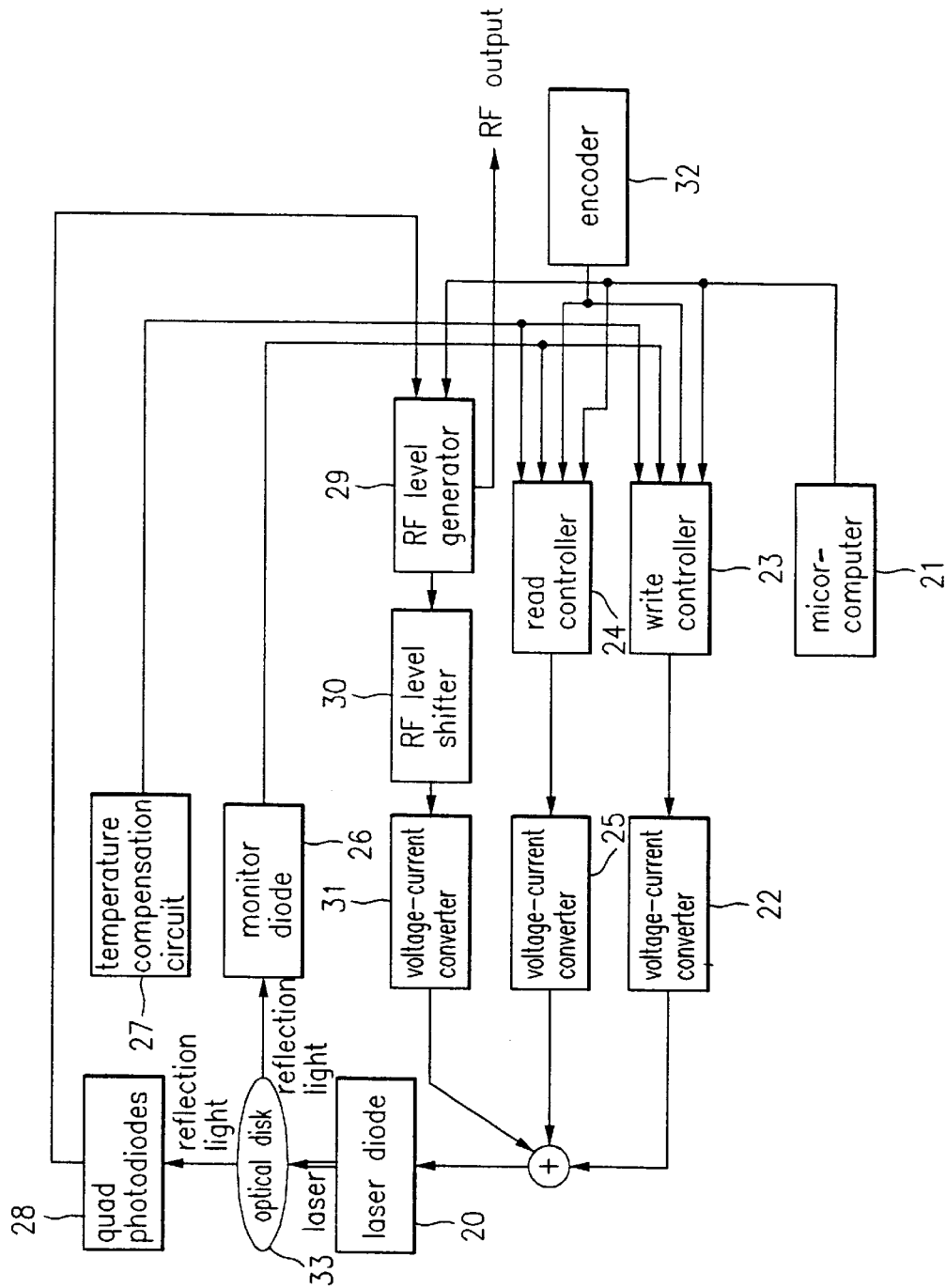
FIG. 3 is a block diagram of the write/read apparatus according to the present invention.

Optical disk write/read apparatus of the present invention, as shown in FIG. 3, includes a laser diode 20 for writing/reading data on the optical disk 33, a write controller 23 and a read controller 24 which set up the write/read power reference necessary to generate the pit on the optical disk according to a user command and, in order to maintain the laser power of the write/read laser diode 20 at a constant level, control the output power of laser diode 20 through voltage-current converters 22 and 25 in response to a control signal from microcomputer 21, a monitor diode 26 which, in order to maintain the change of the laser power in a constant range in the write/read mode, detects the reflection light reflected from the optical disk 33 according to the write/read power of the laser diode 20 and feeds the detected reflection signal back to said write controller or said read controller, a temperature compensation circuit 27 which compensates the change of the laser power according to the temperature change of the laser diode 20 and maintains the laser power of the laser diode 20 at a constant level without any relation to the temperature change, quad photodiodes 28 which convert the reflection light reflected from the optical disk 33 in the write mode into current signals, a RF signal generator 29 which receives and adds the current signals from the quad photodiodes 28, and generates a RF signal with a specific voltage, a RF level shifter 30 which shifts the output signal level of said RF signal generator 29 into a specific level, and a voltage-current converter 31 which converts the output voltage level of said RF level shifter 30 into a current level.

The output signals of the voltage-current converters 22 and 25 whose inputs are connected to the write controller 23 and the read controller 24, respectively, are added to the output signal of the voltage-current converter 31 whose input is connected to the RF level shifter 30. The added output signal is applied to the laser diode 20. The output signal of the encoder 32 is connected to the inputs of the write controller 23 and the read controller 24.

The operation of the apparatus according to the present invention is explained by referring to FIGS. 4(A)–4(H).

Figure 4A:
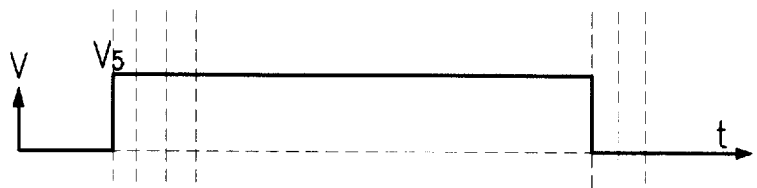
FIGS. 4(A)–4(H) are the signal waveform in a write mode of the optical disk according to the present invention.
Figure 4B:

If the write/read power reference necessary for the pit generation, according to user command, is applied from the microcomputer 11 to the write controller 23, the write controller 23, according to the write signal $V_5$ of FIG. 4A obtained from the encoder 32, generates a write control signal for data. This write control signal is converted into the current signal $I_1$ of FIG. 4B through a voltage-current converter 22 and the current signal $I_1$ drives the laser diode 20.

The laser diode 20 is driven by said current signal $I_1$ and generates a laser of the write power. If this laser is irradiated on the optical disk 33, there is a reflection light reflected from the optical disk 33. This reflection light is converted into four RF signals by quad photodiodes 28. The four RF signals obtained from the quad photodiodes 28 are added to each other and amplified in the RF signal generator 29 so as to generate a RF signal $V_6$ shown in FIG. 4C.

Figure 4C:
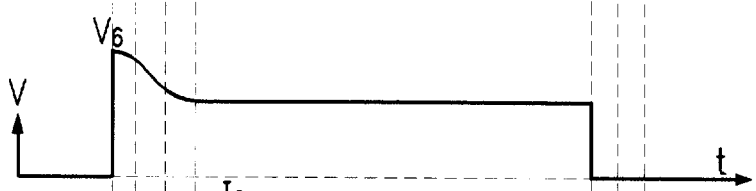

The reason that the RF signal $V_6$ as shown in FIG. 4C is generated is as following: The reflection light reflected from a land of the optical disk is more than the reflection light reflected from a pit of the optical disk. And the write power is larger than the read power. Therefore, if the intensity of the laser is raised in order to write data on the optical disk, the light intensity is increased without the pit generation and therefore the reflected light reflected in the early stage is very strong. Therefore, said strong reflected light is converted into the RF signal by the quad photodiodes 28 and, as the result, the RF signal which is fed back at the initial stage is very large, as shown in FIG. 4C. However, as time goes on, when the heat absorbed by the optical disk is increased and the temperature of the surface of the optical disk goes up to a threshold level, a pit begins to be generated and the reflection light reflected from the optical disk is gradually decreased. After the pit is completely formed, the reflection light reflected from the optical disk 33 according to the output laser of the laser diode 20 is of small quantity. This small quantity of the reflection light is converted into a RF signal by the quad photodiodes 28 is flat, as shown in FIG. 4C.

Figure 4D:

This RF signal is converted into a specific level by the RF level shifter 30 and agian converted into a current signal $I_2$ shown in FIG. 4D by the voltage-current converter 31. The current signal $I_2$ is added to the rectangular current signal $I_1$ obtained from the voltage-current converter 25, as shown in FIG. 4D. The added current signal becomes a new drive current of the laser diode 20, as shown in FIG. 4D.

Figure 4E:

In response to the new drive current of said laser diode 20, the write power laser having a very strong initial value is generated. If this initial strong write power is irradiated on the optical disk 33, the reflection light reflected from the optical disk 33 is converted into a RF signal having a large initial value $V_7$, as shown in FIG. 4E. Because this RF signal $V_7$ having a large initial value is fed back to the drive current of the laser diode 20 through the voltage-current converter 31, the time $\Delta t_8$ required for the temperature of the write layer of the optical disk to go up to the temperature necessary to change its phase is greatly decreased, as shown in FIG. 4F.

Figure 4F:
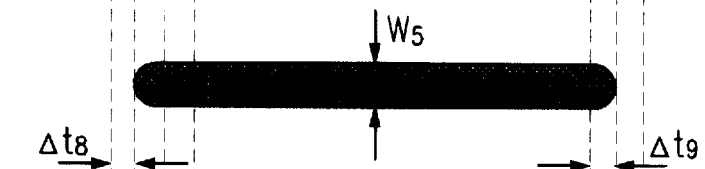

Furthermore, because the initial write power of the laser diode 20 become high by using the reflection light reflected from the optical disk 33, the write power necessary to generate the write pit becomes lower than the conventional technique and the width $W_5$ of the write pit shown in FIG. 4F becomes smaller than ever.

Figure 4G:
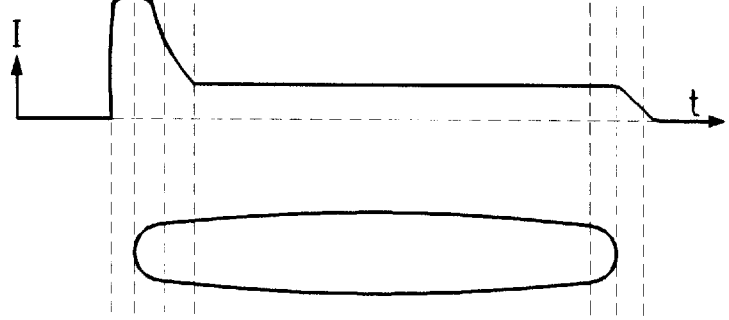
Figure 4H:
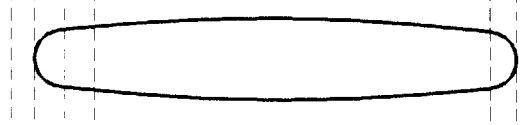

And the optical disk write/read apparatus according to the present invention, as shown in FIGS. 4G and 4H, generates almost uniform write pits even though the characteristics of optical disks are different each other.

For example, when the optical disk is driven by a constant laser power and the reflection coefficient of the optical disk is small because of the large absorption of the optical disk, the reflection light reflected from the optical disk 33 is small and the compensation RF signal according to the feedback signal is also small. Therefore, the total drive current of the laser diode 20 becomes small and the laser power irradiated on the optical disk 33 becomes small.

On the contrary, when the reflection coefficient of the optical disk is large because of a small absorption of the optical disk, the reflection light reflected from the optical disk 33 becomes large and the compensation RF signal according to the feedback signal is also large. Therefore, the total drive current of the optical diode 20 becomes large and the laser power irradiated on the optical disk 33 becomes also large.

As the result, the heat absorbed by the optical disk, without any relation to the change of the characteristic of optical disks, is constant and the time required for the temperature of the optical disk to go up to the temperature of its phase change is much the same. Therefore, even though various optical disks having different characteristic each other are driven by the same write power, the generated pit patterns are much the same, as shown in FIG. 4H.

On the other hand, because the operations of the monitor diode 26 and the temperature compensation circuit 27 are the same as those of the monitor diode 2 and the temperature compensation circuit 6 in the conventional techiniques, the explanation for the diode 26 and the circuit 27 are omitted.

When the optical disk is read out, the RF signal generator 29 is stopped by the control signal of the microcomputer 21 and the RF signal is not fed back. Because the other operations are the same as those in the conventional technique, the explanation for them is also omitted.

As explained above, according to the optical disk write/read apparatus and optical disk write method of the present invention, by using a large quantity of reflection light reflected from the optical disk in the early stage of the write mode the compensation RF signal is generated. And the compensation RF signal is fed back and added to the drive current of the laser diode which outputs the write power. Therefore, the write power of the laser diode is modulated by the compensation RF signal and, because data are written on the optical disk by using this write power the pit generation is done quickly and the pit edge becomes sharp.

Furthermore, because the pit edge is sharp, it is possible for the write power to be lower than that in the conventional technique. Because of the lowered write power, the width of the pit is narrow. As the result, even though the laser power becomes large, the pit length owing to the survived heat becomes short and it is possible to form the very similar pits on various optical disks.

What is claimed is:

1. Optical disk write method for writing data on an optical disk comprising the steps of:

generating a write control signal according to a write power reference which is generated from a microcomputer in response to a user command and is necessary to form a pit on the optical disk and a write signal obtained from an encoder;

starting a write mode by generating the write power of a laser diode according to said write control signal and by irradiating said write power on the optical disk; and modulating the write power of said laser diode by generating a RF signal from the reflection light of the power of the laser diode reflected from the optical disk, by generating a compensation control signal from said RF signal and by feeding said compensation control signal back to the drive current of said laser diode.

2. Optical disk write method as claimed in claim 1, wherein the steps of detecting the light intensity emitted from said laser diode and of controlling said write power to be in a specific range according to said light detected are further included.

3. Optical disk write method as claimed in claim 1, wherein the step of monitoring the temperature of the laser diode, further including the steps of; generating a control signal according to the monitored temperature, feeding the control signal back to the drive signal of the laser diode, and compensating the drive signal of the laser diode by the temperature change so as to keep a constant write power of the laser diode without any relation to the temperature change.

4. Optical write/read apparatus comprising:

a write controller generating a write control signal for data according to a write power reference which is generated from a microcomputer in response to a user command and is necessary to form a pit on an optical disk and the write signal obtained from an encoder;

a read controller generating a read control signal for data according to a read power reference which is generated from a microcomputer and is necessary to read data from the optical disk and the read signal obtained from an encoder;

a voltage-current converter converting each output of said write controller and said read controller into specific current levels, respectively;

a write power generator being driven by said voltage-current converter and generating a write power to write/read on the optical disk; and a modulating method, by generating a RF signal from the reflection light of said write power in a write mode, by converting said RF signal into a compensation control signal and by feeding said control signal back to said write, modulating said write power of said write power generator.

5. Optical write/read apparatus as claimed in claim 4, wherein, in order to keep a constant write power of said write power generator without any relation to a temperature change, a temperature compensation circuit to compensate the drive signal of said write power generator is further included.

6. Optical write/read apparatus as claimed in claim 4, wherein a compensation circuit which is detecting the light intensity emitted from said write power generator and is controlling said write power to be in a specific range is further included.

* * * * *